(12) United States Patent
Eda et al.

(10) Patent No.: US 10,208,833 B2
(45) Date of Patent: Feb. 19, 2019

(54) SLIDING MEMBER, CHAIN LINK, AND CHAIN COMPRISING SAID LINK

(71) Applicant: BorgWarner Inc., Auburn Hills, MI (US)

(72) Inventors: Junichi Eda, Mie (JP); Yasushi Miyazaki, Mie (JP); Yukio Yoshida, Mie (JP); Kazuo Hokkirigawa, Sendai (JP)

(73) Assignee: BorgWarner Inc., Auburn Hills, MI (US)

( * ) Notice: Subject to any disclaimer, the term of this patent is extended or adjusted under 35 U.S.C. 154(b) by 461 days.

(21) Appl. No.: 14/900,325

(22) PCT Filed: Jun. 25, 2014

(86) PCT No.: PCT/US2014/044005
§ 371 (c)(1),
(2) Date: Dec. 21, 2015

(87) PCT Pub. No.: WO2015/002775
PCT Pub. Date: Jan. 8, 2015

(65) Prior Publication Data
US 2016/0153525 A1 Jun. 2, 2016

(30) Foreign Application Priority Data
Jul. 3, 2013 (JP) ................. 2013-139629

(51) Int. Cl.
*C21D 9/00* (2006.01)
*F16G 13/04* (2006.01)
(Continued)

(52) U.S. Cl.
CPC ............ *F16G 13/04* (2013.01); *B32B 15/011* (2013.01); *C21D 1/18* (2013.01); *C21D 1/22* (2013.01);
(Continued)

(58) Field of Classification Search
CPC ................ C21D 1/18; C23C 8/22; C23C 8/26
See application file for complete search history.

(56) References Cited

U.S. PATENT DOCUMENTS 3,912,551 A 10/1975 Araya
5,900,077 A 5/1999 McVicker et al.
(Continued)

FOREIGN PATENT DOCUMENTS

JP S4965944 A 6/1974
JP 5641370 A 4/1981
(Continued)

OTHER PUBLICATIONS

ASM International, Materials Park, Ohio, Heat Treating, "Introduction to Surface Hardening of Steels", pp. 259-267, Aug. 1991.*
(Continued)

*Primary Examiner* — Jessee R Roe
(74) *Attorney, Agent, or Firm* — BrooksGroup

(57) ABSTRACT

[Problem] To provide a chain link which can improve wear resistance even under lubricating conditions in adhesive mode. [Solution] Steel link plates 2 for a silent chain having pinholes 22 for inserting linking pins 3 are formed. A hardened layer obtained by performing heat treatment (martempering, for example) is formed on the inner circumferential surface of the pinholes 22, and a large number of hard particles hp having the same hardness as or a greater hardness than the surface hardness of said hardened layer are dotted in a crystalline state within the martensite structure on the surface layer section of the hardened layer. The hard particles hp are an oxide, carbide or nitride of any element from Cr, V, Ti and Nb which was originally present in the steel of the link plate material.

5 Claims, 8 Drawing Sheets

(51) Int. Cl.
*C22C 38/00* (2006.01)
*F16H 9/24* (2006.01)
*C22C 38/12* (2006.01)
*C22C 38/22* (2006.01)
*C21D 1/22* (2006.01)
*B32B 15/01* (2006.01)
*C21D 1/18* (2006.01)
*C22C 38/02* (2006.01)
*C22C 38/04* (2006.01)
*C22C 38/42* (2006.01)
*C22C 38/44* (2006.01)
*C23C 8/00* (2006.01)

(52) U.S. Cl.
CPC ............ *C21D 9/0087* (2013.01); *C22C 38/00* (2013.01); *C22C 38/02* (2013.01); *C22C 38/04* (2013.01); *C22C 38/12* (2013.01); *C22C 38/22* (2013.01); *C22C 38/42* (2013.01); *C22C 38/44* (2013.01); *C23C 8/00* (2013.01); *F16H 9/24* (2013.01); *C21D 2211/004* (2013.01); *C21D 2211/008* (2013.01)

(56) References Cited

U.S. PATENT DOCUMENTS

| 6,520,231 B1 | 2/2003 | Dohmeier |
| 2013/0086881 A1 | 4/2013 | Joergensen et al. |

FOREIGN PATENT DOCUMENTS

| JP | H10169723 A | 6/1998 |
| JP | 2000249196 A | 9/2000 |
| JP | 2002195356 A | 7/2002 |
| JP | 2003269550 A | 9/2003 |
| JP | 2005291349 A | 10/2005 |
| JP | 2005299800 A | 10/2005 |
| JP | 2006132637 A | 5/2006 |
| JP | 2006336056 A | 12/2006 |
| JP | 2008223859 A | 9/2008 |
| JP | 2011122190 A | 6/2011 |
| WO | 2007134651 A1 | 11/2007 |

OTHER PUBLICATIONS http://www.misumi-techcentral.com/tt/en/mold/2009/07/0003-the-chemical-composition-of-steel-for-mold-manufacturing.html (Jul. 15, 2009).*

International Search Report and Written Opinion; dated Oct. 13, 2014; for International Application No. PCT/US2014/044005; 12 pages.

Japanese Office Action dated Sep. 29, 2015 ; Application No. 2013-139629; 7 pages.

Japanese Office Action dated Mar. 7, 2016 ; Application No. 2013-139629; 6 pages.

* cited by examiner sprocket: $23^N \times 23^N$
revolution: 3,000 rpm
chain tension: 2,000 N
lubricant: low-viscosity oil
(containing oil with soot of 0.4%)
oil temperature: 120 ℃
oil amount: 0.5 L / min

SLIDING MEMBER, CHAIN LINK, AND CHAIN COMPRISING SAID LINK

TECHNICAL FIELD

The present invention relates to a sliding member, in particular a chain link, which can improve wear resistance even under lubricating conditions in adhesive mode.

PRIOR ART

Power transmission chains such as silent chains, roller chains and leaf chains, engine camshaft drive chains, oil pump drive chains and balance chains etc. comprise a large number of links which are endlessly linked by way of linking pins, and when the chain is operating, the links slide in rotation about the linking pins and the linking pins and (or) pinholes in the links are worn as a result. Various methods have been proposed in the past in order to improve the wear resistance of the linking pins and the pinholes in the links.

There have been a large number of proposals for improving the wear resistance of linking pins, as described in JP 56-41370 A, JP 10-169723 A, JP 2002-195356 A, JP 2006-336056 A, and JP 2011-122190 A, for example.

The abovementioned JP 56-41370 A indicates that a chromium layer is formed on the surface of a pin material by subjecting the pin material to chromizing, and a large number of metal carbides combined with carbon, chromium and metal elements are dotted in the chromium layer; JP 10-169723 A indicates that a carbide layer of at least one element from among chromium, titanium, vanadium and niobium is formed on the surface of a pin material; JP 2002-195356 A indicates that a carbide layer including vanadium carbide and chromium carbide is formed on the surface of a pin material by subjecting the pin material to chromium and vanadium penetration treatment; JP 2006-336056 A indicates that a double vanadium carbide layer (VxC+VyC) is formed on the surface of a pin material by subjecting the pin material to chromium and vanadium penetration and diffusion treatment; and JP 2011-122190 A indicates that a carbide layer is formed on the surface of a pin material with the interposition of an interlayer comprising a complex carbide, by subjecting the pin material to penetration treatment.

Furthermore, JP 2008-223859 A, for example, is intended to improve wear resistance of pinholes in links.

The abovementioned JP 2008-223859 A indicates that a low hardness surface constituting an exposed surface of carbon steel and a high hardness surface comprising a carbide layer produced by diffusion and penetration treatment are formed on the inner circumferential surface of pinholes in a link.

In addition, JP 2000-249196 A, JP 2003-269550 A, JP 2005-291349 A, and JP 2006-132637 A are intended to improve wear resistance of linking pins and pinholes in links.

The abovementioned JP 2000-249196 A indicates that a metal carbide layer is formed on the surface of a pin material by subjecting the pin material to diffusion and penetration treatment, and a nitride layer or metal carbide layer is formed on the surface of a link by subjecting the link surface to diffusion and penetration treatment; JP 2003-269550 A indicates that a carbide layer comprising vanadium carbide and chromium carbide is formed on the surface of a pin material by subjecting the pin material to penetration treatment, and pinholes in a link are subjected to finishing; JP 2005-291349 A indicates that a hard carbide layer is formed on the surface of a pin material by subjecting the pin material to diffusion and penetration treatment, and a DLC layer is formed on the surface of the hard carbide layer, while the DLC layer is also transferred to the inner circumferential surface of pinholes in a link; and JP 2006-132637 A indicates that a VC layer is formed on the surface of a pin material and a link surface is subjected to chromizing.

SUMMARY OF THE INVENTION

Problem to be Solved by the Invention

However, in each of the publications mentioned above, although a constant effect can be anticipated under lubricating conditions in which sufficient oil is supplied, it is not necessarily possible to achieve good wear resistance under the lubricating conditions of what is known as adhesive mode, in which the oil film is ruptured as a result of dilution of oil or a reduction in oil supply, or a drop in oil viscosity or oil deterioration etc., or corrosion is produced by the presence of soot in the oil (soot attack).

The present invention has been devised in view of the conventional situation described above, and the problem to be solved by the present invention lies in providing a sliding member and a chain link which can improve wear resistance even under lubricating conditions in adhesive mode.

Means for Solving the Problem

In order to solve the abovementioned problem, the inventors of the invention of this application compiled diligent research relating to wear resistance of chain components, and especially the pinholes in chain links, and performed tests under various lubricating conditions in adhesive mode using a variety of materials having different compositions; the inventors arrived at the invention of this application as a result of this work.

The sliding member according to the present invention is a sliding member made of steel, wherein a hardened layer obtained by performing heat treatment is formed on the surface thereof, and a large number of hard particles having the same hardness as or a greater hardness than the surface hardness of said hardened layer are dotted in a crystalline state on the surface layer section of the hardened layer (see claim 1).

By virtue of the sliding member according to the present invention, a large number of hard particles are dotted on the surface layer section of the hardened layer formed on the surface of the sliding member, and therefore when the sliding member slides against a member subjected to sliding, especially under the lubricating conditions of what is known as adhesive mode, in which the oil film is ruptured as a result of dilution of oil or a reduction in oil supply, or a drop in oil viscosity or oil deterioration etc., or corrosion is produced by the presence of soot in the oil (soot attack), the large number of hard particles exposed at the surface layer section of the hardened layer demonstrate what is known as an "anchor effect" and attempt to remain in that location, whereby it is possible to effectively prevent the surface layer section of the hardened layer around the hard particles from causing plastic flow due to sliding at the member subjected to sliding, and as a result it is possible to reduce adhesive wear of the surface of the sliding member and to improve wear resistance.

The hard particles are an oxide, carbide or nitride of any element from Cr, V, Ti and Nb which was originally contained in said sliding member before the heat treatment (see claim 2).

The hardened layer is formed by means of martempering, and the hardened particles have a crystal grain size of several microns to several tens of microns and are dotted in a crystalline state within the martensite structure (see claim 3).

The thickness of the hardened layer is 20-30 μm (see claim 4).

The hardness of the hard particles is Hv 550-2500, and the surface hardness of the hardened layer of the sliding member is Hv 500-600 (see claim 5).

Furthermore, the chain link according to the present invention is a chain link made of steel and having pinholes for insertion of linking pins, wherein a hardened layer obtained by performing heat treatment is formed on the inner circumferential surface of the pinholes, and a large number of hard particles having the same hardness as or a greater hardness than the surface hardness of said hardened layer are dotted in a crystalline state on the surface layer section of the hardened layer (see claim 6).

By virtue of chain link according to the present invention, a large number of hard particles are dotted on the surface layer section of the hardened layer formed on the inner circumferential surface of the pinholes, and therefore when the link slides against the linking pins, especially under the lubricating conditions of what is known as adhesive mode, in which the oil film is ruptured as a result of dilution of oil or a reduction in oil supply, or a drop in oil viscosity or oil deterioration etc., or corrosion is produced by the presence of soot in the oil (soot attack), the large number of hard particles exposed at the surface layer section of the hardened layer on the inner circumferential surface of the pinholes in the link demonstrate what is known as an "anchor effect" and attempt to remain in that location, whereby it is possible to effectively prevent the surface layer section of the hardened layer around the hard particles from causing plastic flow due to sliding at the outer circumferential surface of the linking pins, and as a result it is possible to reduce adhesive wear of the inner circumferential surface of the pinholes in the link and to improve wear resistance.

A chain comprising the abovementioned chain link is such that a hardened layer comprising a carbide or nitride of any one or two or more elements from Cr, V, Ti, Nb and W is formed on the linking pins, and the surface hardness of the hardened layer is the same as or greater than the hardness of the hard particles (see claim 7).

Advantage of the Invention

As described above, according to the present invention, a large number of hard particles are dotted on the surface layer section of the hardened layer formed on the surface of the sliding member (or the inner circumferential surface of the pinholes), and therefore when the sliding member (or the link) slides against the member subjected to sliding (or the linking pins), especially under the lubricating conditions of what is known as adhesive mode, in which the oil film is ruptured as a result of dilution of oil or a reduction in oil supply, or a drop in oil viscosity or oil deterioration etc., or corrosion is produced by the presence of soot in the oil (soot attack), the large number of hard particles exposed at the surface layer section of the hardened layer demonstrate what is known as an "anchor effect" and attempt to remain in that location, whereby it is possible to effectively prevent the surface layer section of the hardened layer around the hard particles from causing plastic flow due to sliding at the member subjected to sliding (or the linking pins), and as a result it is possible to reduce adhesive wear of the surface of the sliding member (or the inner circumferential surface of the pinholes in the link) and to improve wear resistance.

MODE OF EMBODIMENT OF THE INVENTION

An exemplary embodiment of the present invention will be described below with reference to the appended figures.

FIG. 1 to FIG. 5 are diagrams to illustrate an exemplary embodiment of the present invention. The description in this instance relates to an example in which the sliding members are link plates in a silent chain.

Figure 1:
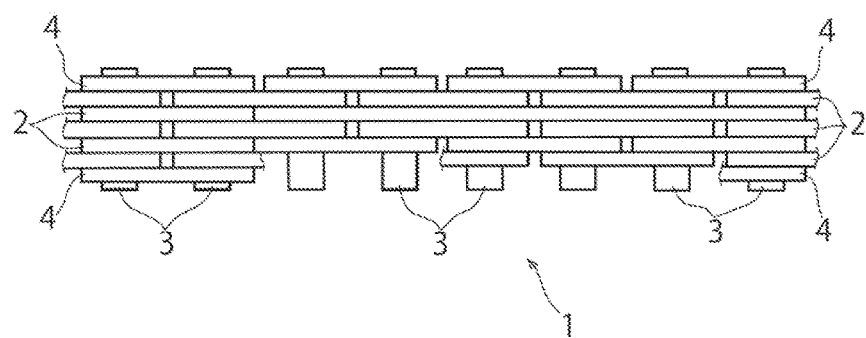
FIG. 1 A schematic partial plan view of a silent chain employing link plates in accordance with an exemplary embodiment of the present invention.
Figure 2:
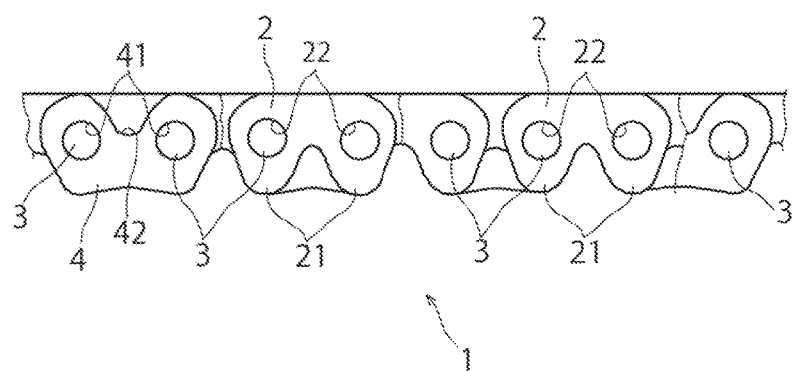
FIG. 2 A schematic partial front view of the silent chain (FIG. 1).

As shown in FIG. 1 and FIG. 2, a silent chain 1 is constructed by stacking a large number of link plates 2 having respective pairs of tooth parts 21 and pinholes 22 in the thickness direction (the vertical direction in FIG. 1, the direction perpendicular to the page in FIG. 2) and the lengthwise direction (the left-right direction in FIG. 1 and FIG. 2), and by pivotably and endlessly linking the link plates 2 using linking pins 3 which are inserted into the pinholes 22. Guide links 4 having the function of guiding the silent chain over a chain guide or a tensioner arm which is not depicted are provided on the outermost side of the link plates 2, and the ends of the linking pins 3 are fixed inside pinholes 41 of the guide links 4.

Figure 3:
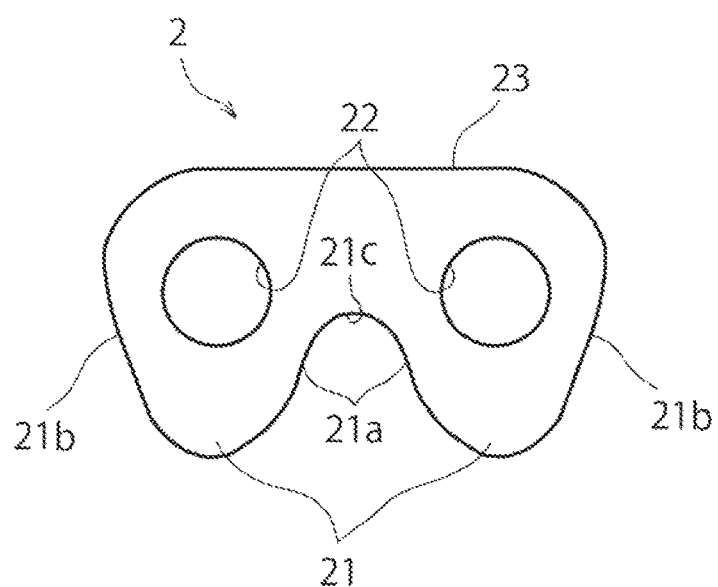
FIG. 3 An enlarged front view of the link plate (FIG. 1).

The tooth parts 21 of the link plates 2 comprise inside flank surfaces 21a and outside flank surfaces 21b, the inside flank surfaces 21a being linked by a crotch part 21c, as shown in FIG. 3. Furthermore, a back surface 23 is provided on the opposite side of the link plates 2 to the tooth parts 21. It should be noted that this instance relates to an example of circular holes for the pinholes 22 in the link plates 2, and also to an example of pins having a circular transverse section (a cylindrical shape in other words) for the linking pin 3. Furthermore, this instance relates to an example of what are known as low-rigidity guides for the guide links, in which a crotch part 42 is formed on the back surface side thereof.

A type of chromium-molybdenum steel having a chemical composition such as that shown in table 1, for example, is used as the carbon steel material forming the link plates 2. In the table, the numerals in the bottom row indicate the percentage proportion of each chemical component in the top row. As shown in the table, this carbon steel includes carbon (C), silicon (Si), manganese (Mn), phosphorus (P), sulfur (S), copper (Cu), nickel (Ni), chromium (Cr), and molybdenum (Mo), the carbon content being greater than in conventional chromium-molybdenum steel.

TABLE 1

| C | Si | Mn | P | S | Cu | Ni | Cr | Mo |
|---|---|---|---|---|---|---|---|---|
| 0.54 | 0.20 | 0.36 | 0.012 | 0.002 | 0.02 | 0.03 | 1.06 | 0.25 |

Table 2 shows the proportion of each chemical component in the carbon steel in table 1 within maximum and minimum value ranges. The numerals above in the bottom row of table 2 indicate the minimum values while the numerals below indicate the maximum values. Values at least in the ranges shown in table 2 can be considered suitable for the proportion of each chemical component of the carbon steel used in this exemplary embodiment.

TABLE 2

| C | Si | Mn | P | S | Cu | Ni | Cr | Mo |
|---|---|---|---|---|---|---|---|---|
| 0.52 | 0.15 | 0.30 | — | — | — | — | 0.90 | 0.20 |
| \| | \| | \| | \| | \| | \| | \| | \| | \| |
| 0.58 | 0.35 | 0.50 | 0.016 | 0.020 | 0.20 | 0.25 | 1.20 | 0.40 |

Here, the chemical composition of carbon steel for mechanical structures which constitutes the carbon steel material forming conventional link plates is shown in table 3 by way of reference. In table 3, the numerals in the bottom row indicate the percentage proportion of each chemical component in the top row, in the same way as in table 1. As shown in the table, this carbon steel includes carbon (C), silicon (Si), manganese (Mn), phosphorus (P), sulfur (S), and a small amount of chromium (Cr).

TABLE 3

| C | Si | Mn | P | S | Cu | Ni | Cr | Mo |
|---|---|---|---|---|---|---|---|---|
| 0.55 | 0.21 | 0.78 | 0.019 | 0.005 | — | — | 0.07 | — |

Furthermore, table 4 shows the proportion of each chemical component in the carbon steel in table 3 within maximum and minimum value ranges, the numerals above in the bottom row of the table indicating the minimum values and the numerals below indicating the maximum values.

TABLE 4

| C | Si | Mn | P | S | Cu | Ni | Cr | Mo |
|---|---|---|---|---|---|---|---|---|
| 0.51 | 0.15 | 0.75 | — | — | — | — | 0.05 | — |
| \| | \| | \| | \| | \| | | | \| | |
| 0.55 | 0.25 | 0.95 | 0.020 | 0.010 | | | 0.10 | |

Figure 4:
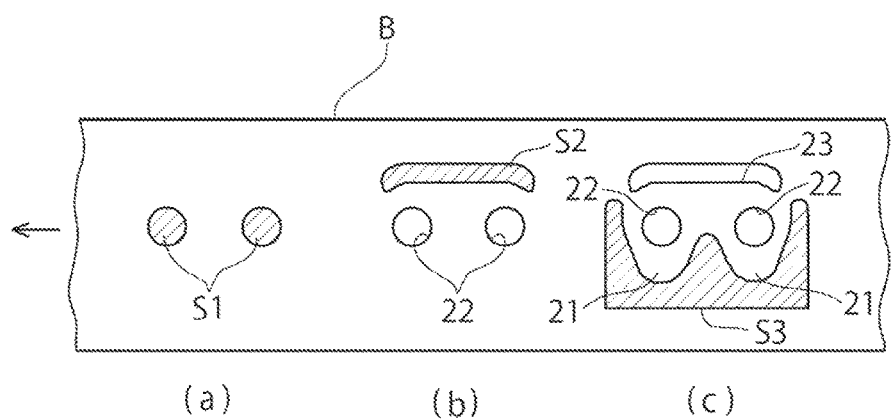
FIG. 4 A diagram to illustrate the process of press-punching the link plate (FIG. 1).

The pinholes and the external shape of the link plates 2 are formed by press-punching a carbon steel strip having a chemical composition such as that shown in table 1 or table 2. FIG. 4 is a process diagram showing an example of this kind of press-punching process.

As shown in FIG. 4, a steel strip blank material B is conveyed in the direction of the arrow and is pressed-punched in succession from (a)-(c) while being moved to a processing location (not depicted) provided on the left-hand side of the figure. It should be noted that the oblique line regions in the figure indicate regions which will form waste (scrap).

First of all, in the first process (a) in FIG. 4, the oblique line region S1 is punched (pierced), whereby a pair of holes forming the pinholes 22 in the link plate are formed. Next, in the second process (b), the oblique line region S2 is punched, whereby the back surface 23 forming the back part of the link plate is formed. Next, in the third process (c), the oblique line region S3 is punched, whereby an essentially W-shaped surface forming the tooth parts 21 of the link plate is formed. In the final process, left and right shoulder parts of the link plate are then punched and the link plate is removed from the blank material B, although this is not shown in the figure.

Moreover, a shaving or burnishing process for improving the surface roughness may be applied, as required, to the pinholes 22 and tooth parts 21 or back surface 23 of the link plate by using a shaving tool or a burnishing tool in the process of press-punching the link plate, although this will not be described in detail here.

The press-punched link plate which has been removed from the blank material B is heat treated in the following process.

The term "heat treatment" as used herein refers to operations in which a metal is heated to a certain temperature and then cooled in order to modify the metal to a required metallographic structure, and includes treatments such as quenching, tempering, annealing, normalizing, and martempering, but the term "heat treatment" as used in the present specification does not include treatment such that elements such as Cr and V are made to diffuse and penetrate into the metal from outside the metal, as with chromizing or vanadizing.

The link plate is subjected to martempering in this exemplary embodiment. The martempering conditions are as follows.

1) Heating temperature: 890° C.
2) Heating time: 38 min.
3) CP value: 0.55
4) Salt tempering temperature: 280° C.
5) Salt tempering time: 70 min.

Conventional link plates are also subjected to martempering, but the conditions thereof differ from those of this exemplary embodiment and are as follows.

1) Heating temperature: 850° C.
2) Heating time: 38 min.
3) CP value: 0.50
4) Salt tempering temperature: 280° C.
5) Salt tempering time: 70 min.

As is clear from comparing the two sets of conditions, the heating temperature and the atmospheric CP value are higher in this exemplary embodiment than in conventional martempering.

After martempering, the link plate is introduced into a barrel tumbler and subjected to barrel polishing.

Figure 5:
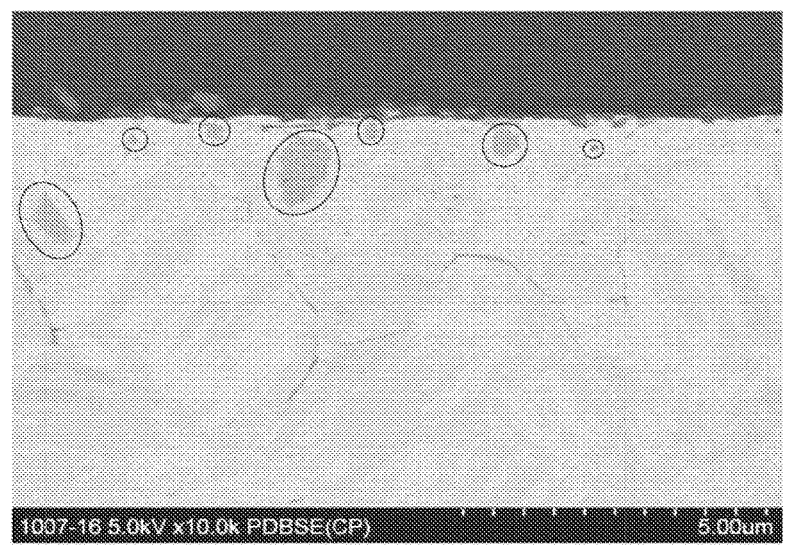
FIG. 5 An electron microscope photograph of the cross section of a pin hole in the link plate (FIG. 1).

FIG. 5 shows a photograph in which the barrel-polished link plate was cut in the cross section through the pinholes and an image of the cross section thereof was captured using an electron microscope (reflected electron image). In the figure, the black strip-like region at the top is a resin member for holding the link plate, and the surface extending in the left-right direction at the interface with the resin member is the inner circumferential surface of the pinhole.

FIG. 5 shows the cross section of the hardened layer of the link plate and the core part (parent material) of the lower layer; the thickness of the hardened layer is about 20 μm, although this is not clear in the figure. The thickness of the hardened layer should be 20-30 μm. A large number of regions which are darker than the surrounding area are dotted at locations enclosed in a circle or an ellipse in the surface layer section of the hardened layer (in other words the region in the vicinity of the inner circumferential surface of the pinholes). These are crystals of hard particles which have a greater hardness than the surface of the hardened layer, and in this exemplary embodiment they are believed to be chromium (Cr) oxide (CrxOy). It is inferred that the chromium oxide is a deposit which is formed as a result of the oxygen component in the CP 0.55 furnace atmosphere bonding with the chromium which was originally present within the link plate during martempering. The crystal grain size of the hard particles is between several microns and several tens of microns.

Figure 6:
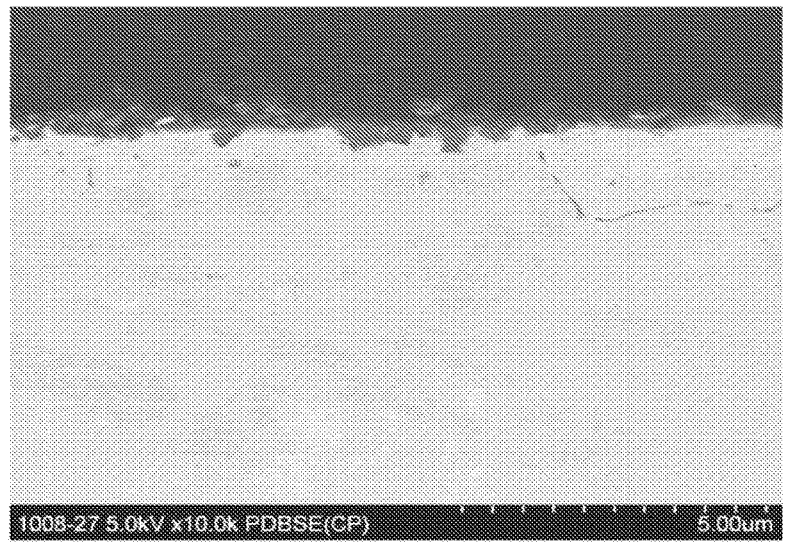
FIG. 6 An electron microscope photograph of the cross section of a pinhole in a conventional link plate.

Meanwhile, FIG. 6 shows an electron microscope photograph (reflected electron image) of the cross section passing through the pinholes in a conventional link plate. The thickness of the hardened layer is also about 20 μm in a conventional link plate, although this is not clear in the figure. Crystal regions of hard particles as in FIG. 5 in which a large number of regions which are darker and harder than the surrounding area are dotted in the surface layer section are not apparent in the surface layer section of the hardened layer of the conventional link plate (in other words the region in the vicinity of the inner circumferential surface of the pinholes). It should be noted that the small number of dark regions which are sparingly apparent in the surface layer section of the hardened layer in FIG. 6 are believed to be inclusions which were already present in the link plate material from before martempering (in other words from when the steel was produced).

Furthermore, the hardness of the hard particles in the link plate according to this exemplary embodiment may be the same as the surface hardness of the hardened layer of the link plate. Specifically, the hardness of the hard particles and the surface hardness of the link plate hardened layer are as follows.

a) Hardness of hard particles: Hv 550-2500
b) Surface hardness of link plate hardened layer: Hv 500-600

Meanwhile, a hardened layer comprising a carbide or nitride of any one or two or more elements from chromium (Cr), vanadium (V), titanium (Ti), niobium (Nb) and tungsten (W) is formed on the linking pins 3. The surface hardness of the hardened layer of the linking pins 3 is preferably the same as or greater than the hardness of the hard particles. Specifically, when the hardened layer is a chromium carbide layer, for example, the hardness of the hardened layer is Hv 600-1700, and when the hardened layer is a vanadium carbide layer, for example, the hardness of the hardened layer is Hv 2400-2500.

The method of wear testing using a silent chain comprising the abovementioned link plates and linking pins will be described next.

It should be noted that in the example described here, what are known as VC pins in which a vanadium carbide layer is formed as a hardened layer are used for the linking pins.

Figure 7:
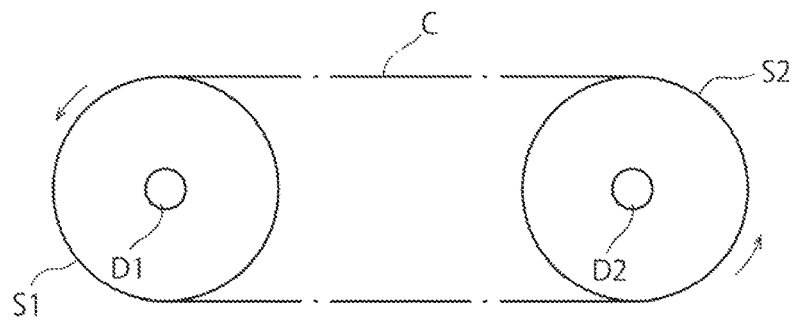
FIG. 7A diagram showing the schematic structure of a silent chain wear test apparatus together with test conditions.

The wear test was carried out using the wear test apparatus which is schematically shown together with the test conditions in FIG. 7. As shown in the figure, the wear test apparatus had a structure in which sprockets S1, S2 each having 23 teeth were fitted on a drive shaft D1 and a driven shaft D2 disposed at a distance, and a silent chain C for testing was wound on the sprockets S1, S2.

The speed of rotation of the drive shaft D1 and driven shaft D2 of the wear test apparatus was 3000 rpm and the chain tension was 2000 N. The lubricating oil temperature was 120° C. and the supply rate was 0.5 L per minute. The lubricating oil which was used was low-viscosity oil including 0.4% oil containing simulation soot. More specifically, the wear test was carried out under real machine firing conditions and also under two types of test conditions, namely employing 10W-30 lubricating oil including 0.4% oil containing simulation soot, and 0W-20 lubricating oil including 0.4% oil containing simulation soot. The wear test was carried out with a 4,500,000 chain cycle (in other words the total number of rotations of the chain was 4,500,000 cycles).

Figure 8:
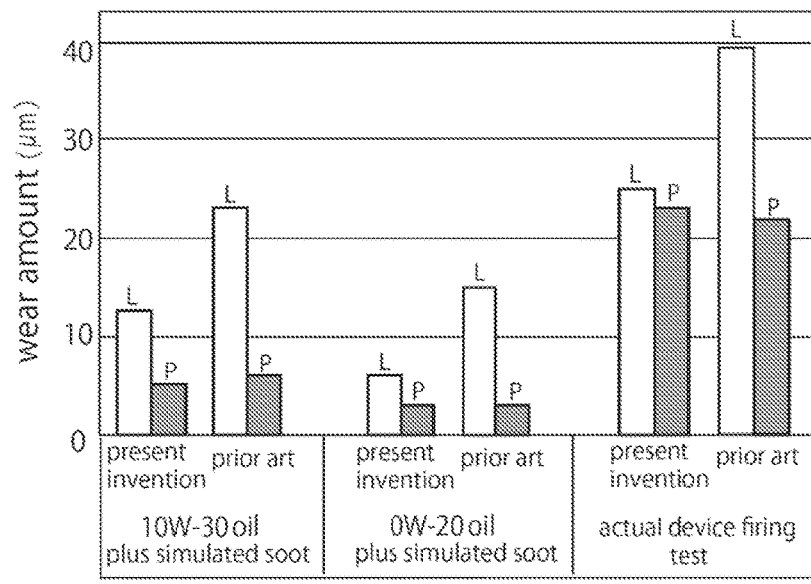
FIG. 8 A graph showing the results of the wear test employing the wear test apparatus (FIG. 7), in which the amount of wear of link plates (L) and pins (P) according to the present invention is compared with the amount of wear of prior art link plates (L) and pins (P) under various testing modes.
Figure 9:
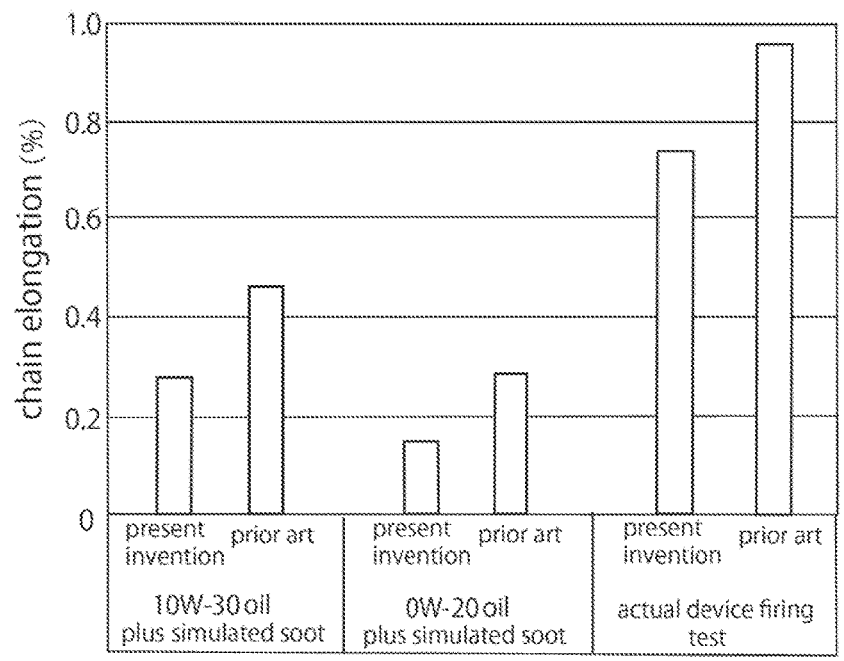
FIG. 9 A comparison of elongation of the silent chain according to the present invention and elongation of a prior art silent chain under the various testing modes in FIG. 8.

The test results from after the wear test carried out using the abovementioned wear test apparatus are shown in FIG. 8 and FIG. 9.

These figures show the wear test results divided into the three test modes described above, namely 10W-30 lubricating oil+simulation soot, 0W-20 lubricating oil+simulation soot, and real machine firing test. FIG. 8 shows the amount of wear of the pinholes in the link plates (L) and the pins (P) as a comparison between an article of the present invention and a prior art article, and FIG. 9 shows the silent chain elongation as a comparison between the article of the present invention and the prior art article.

In FIG. 8, the link plates (L) in the article of the present invention were link plates including the hard particles described above, and the link plates (L) in the prior art article were conventional link plates not including hard particles. Furthermore, in FIG. 8, the linking pins (P) in the article of the present invention and the prior art article were both VC pins. Meanwhile, in FIG. 9, the silent chain in the article of the present invention was a silent chain comprising VC pins and link plates including the hard particles described above, while the silent chain of the prior art article was a silent chain comprising VC pins and conventional link plates not including hard particles.

As is clear from FIG. 8, the link plates (L) in the article of the present invention showed less wear of the pinholes than the link plates (L) in the prior art article in all of the test modes, namely 10W-30 lubricating oil+simulation soot, 0W-20 lubricating oil+simulation soot, and real machine firing test. More specifically, in the 10W-30 lubricating oil+simulation soot test mode, the article of the present invention showed about 48% less pinhole wear than the prior art article; in the 0W-20 lubricating oil+simulation soot test mode, the article of the present invention showed about 60% less pinhole wear than the prior art article, and in the real machine firing test mode, the article of the present invention showed about 36% less pinhole wear than the prior art article. Moreover, there was essentially no difference between the two in terms of the amount of wear of the pins (P) in any of the test modes.

Furthermore, as is clear from FIG. 9, the silent chain in the article of the present invention showed less elongation than the silent chain in the prior art article in all test modes. This can be readily inferred from the results in FIG. 8. More specifically, in the 10W-30 lubricating oil+simulation soot test mode, the article of the present invention showed about 41% less chain elongation than the prior art article; in the 0W-20 lubricating oil+simulation soot test mode, the article of the present invention showed about 48% less chain elongation than the prior art article, and in the real machine firing test mode, the article of the present invention showed about 22% less chain elongation than the prior art article.

Figure 10:
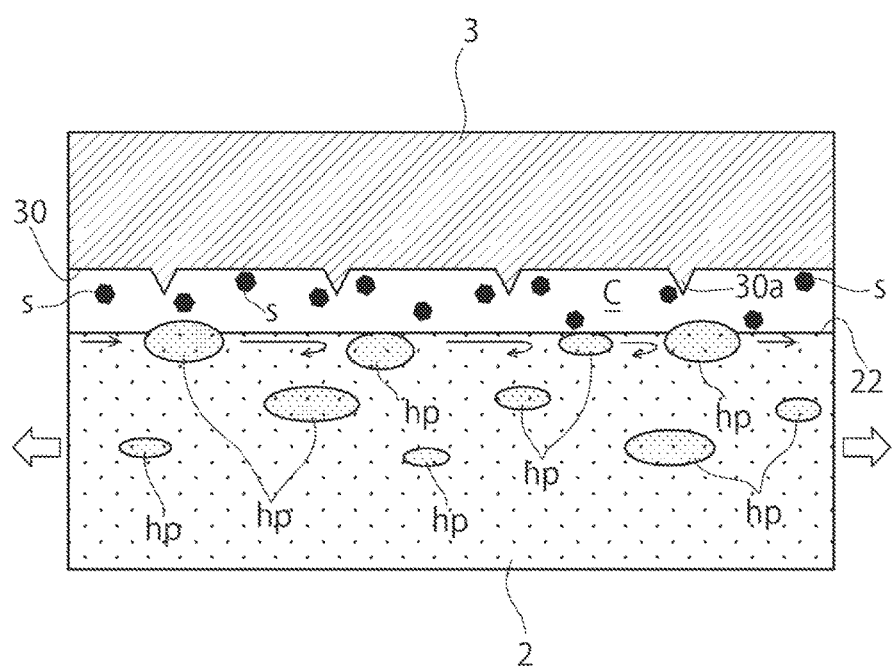
FIG. 10 A schematic diagram to illustrate the state of sliding contact between the link plates and linking pins in accordance with the present invention during operation of the silent chain.

Next, FIG. 10 is an enlarged schematic diagram showing the state of sliding contact between the link plates and linking pins in accordance with the present invention during operation of the silent chain. As shown in this figure, a large number of hard particles hp are dotted in a region in the vicinity of the inner circumferential surface of the pinhole 22 in the link plates (in other words the surface layer section of the hardened layer). The hard particles hp are dotted at irregular intervals to each other not only in the circumferential direction on the inner circumferential surface of the pinhole (the left-right direction in FIG. 10) and in the direction along the cylindrical surface of the inner circumferential surface of the pinhole (the direction perpendicular to the page in the figure), but also in the normal direction of the pinhole 22, in other words the direction advancing into the parent material from the inner circumferential surface of the pinhole (downward in the figure). The linking pins 3 are inserted into the pinholes 22 in the link plates. For the sake of convenience in the figure, the inner circumferential surface of the pinhole 22 in the link plate 2 and the outer circumferential surface 30 of the linking pin 3 are shown as straight lines rather than curved lines. A clearance C is formed between the outer circumferential surface 30 of the linking pin 3 and the inner circumferential surface of the pinhole 22. A large number of projections 30a projecting outward are formed on the outer circumferential surface 30 of the linking pin 3, but the projections 30a are drawn here with exaggerated surface roughness of the outer circumferential surface 30. Furthermore, in the situation depicted, soot s is present in the clearance C between the linking pin 3 and the pinhole 22.

The reason for which the article of the present invention showed considerably less wear of the pinholes in the link plates than the prior art article in the abovementioned wear test will be described with the aid of FIG. 10.

The link plates 2 undergo repeated articulated movement during operation of the silent chain as said silent chain rotates around the sprockets, and as a result the link plates 2 slide in rotation about the linking pins 3 (see the white arrows in FIG. 10).

In this case, if a sufficient amount of oil is supplied to the clearance C between the linking pins 3 and the pinholes 22, it is possible to prevent the inner circumferential surface of the pinholes 22 on the link plates 2 from causing adhesive wear when the link plates 2 slide in rotation about the linking pins 3. On the other hand, when the oil film in the clearance C is ruptured as a result of a reduction in oil supply or dilution of oil, or a drop in oil viscosity or oil deterioration etc., or when the linking pins 3 and the pinholes 22 are corroded by the soot s in the oil (soot attack), the inner circumferential surface of the pinholes 22 in the link plates 2 comes into direct contact with the outer circumferential surface 30 of the linking pins 3 or makes contact through the soot s, which causes plastic flow, and there is a risk of the inner circumferential surface of the pinholes causing adhesive wear as a result.

However, according to this exemplary embodiment as described above, a large number of hard particles hp are dotted on the surface layer section of the hardened layer on the inner circumferential surface of the pinholes in the link plates 2, and therefore when the pinholes 22 slide against the outer circumferential surface of the linking pins 3 under the lubricating conditions of what is known as adhesive mode, which includes oil film rupture and corrosion caused by the soot s, the large number of hard particles hp exposed at the inner circumferential surface of the pinholes demonstrate what is known as an "anchor effect" and attempt to remain in that location, whereby it is possible to effectively prevent the surface layer section of the hardened layer around the hard particles hp from causing plastic flow due to sliding of the linking pins 3 (see the arrows above the inner circumferential surface of the pinholes in FIG. 10), and as a result it is possible to reduce adhesive wear of the inner circumferential surface of the pinholes 22 and to improve wear resistance.

Moreover, the hard particles hp are present not only in the surface layer section on the inner circumferential surface of the pinholes, but also in the depthwise direction in the cross section of the pinholes, and therefore if the surface layer section on the inner circumferential surface of the pinholes is worn and the hard particles hp on the surface layer section become detached, the hard particles hp which are present in the depthwise direction and the cross section of the pinholes are exposed at the surface layer section on the inner circumferential surface of the pinholes and the "anchor effect" is newly demonstrated. It is thus possible to prevent plastic flow at the surface layer section on the inner circumferential surface of the pinholes, and as a result it is possible to reduce adhesive wear of the inner circumferential surface of the pinholes and to improve wear resistance.

The exemplary embodiment described above relates to an example in which circular holes are used for the pinholes in the link plates, and also in which pins having a circular transverse section are used for the linking pins, but the present invention may equally be applied to pinholes and linking pins having any other shape.

The exemplary embodiment described above relates to an example in which a type of chromium-molybdenum steel is used as the steel material and chromium oxide is used for the hard particles, but application of the present invention is not limited by this, and chromium carbide or chromium nitride is equally feasible. Furthermore, it is equally possible to use steel comprising vanadium, titanium or niobium (for example vanadium steel, titanium alloy or niobium steel), and an oxide, carbide or nitride of vanadium (V), titanium (Ti) or niobium (Nb) which was originally contained in the steel may equally be used for the hard particles.

The exemplary embodiment described above relates to an example in which the link plates according to the present invention are used in a silent chain, but the present invention may likewise also be used in link plates for a roller chain and link plates for a leaf chain, and the present invention may not only be used in link plates for a chain, but also for sliding members which slide against each other.

FIELD OF INDUSTRIAL APPLICATION

The present invention is suitable for power transmission chains such as silent chains, roller chains and leaf chains, engine camshaft drive chains, oil pump drive chains and balance chains etc., and in particular for links which are endlessly linked by means of linking pins.

KEY TO SYMBOLS

1: Silent chain
2: Link plate (sliding member)
22: Pinhole
3 Linking pin
hp: Hard particles

PRIOR ART DOCUMENTS

Patent Documents

[Patent Document 1] JP 56-41370 A (see the claims)
[Patent Document 2] JP 10-169723 A (see claim 1)
[Patent Document 3] JP 2002-195356 A (see claim 1)
[Patent Document 4] JP 2006-336056 A (see claim 1)
[Patent Document 5] JP 2011-122190 A (see claim 1)
[Patent Document 6] JP 2008-223859 A (see claim 1)
[Patent Document 7] JP 2000-249196 A (see claims 1 and 3)
[Patent Document 8] JP 2003-269550 A (see claim 1)
[Patent Document 9] JP 2005-291349 A (see claim 1)
[Patent Document 10] JP 2006-132637 A (see claim 1)

The invention claimed is:

1. A sliding member made of steel, wherein a hardened layer obtained by performing heat treatment is formed on a surface thereof, and a large number of hard particles having the same hardness as or a greater hardness than the surface hardness of said hardened layer are dotted in a crystalline state on the surface layer section of the hardened layer; and wherein the hard particles are an oxide, carbide or nitride of any element from Cr, V, Ti and Nb which was originally contained in said sliding member before the heat treatment; and wherein the thickness of the hardened layer is 20-30 μm.

2. The sliding member as claimed in claim 1, wherein the hardened layer is formed by means of martempering, and the hardened particles have a crystal grain size of several microns to several tens of microns and are dotted in a crystalline state within the martensite structure.

3. The sliding member as claimed in claim 1, wherein the hardness of the hard particles is Hv 550-2500, and the surface hardness of the hardened layer of the sliding member is Hv 500-600.

4. A chain link made of steel and having a plurality of pinholes for insertion of a plurality of linking pins, wherein an inner circumferential surface of each of the plurality of pinholes includes a hardened layer obtained by performing heat treatment, and wherein a large number of hard particles having the same hardness as or a greater hardness than the surface hardness of said hardened layer are dotted in a crystalline state on the surface layer section of the hardened layer.

5. A chain comprising the chain link as claimed in claim 4, wherein a hardened layer comprising a carbide or nitride of any one or two or more elements from Cr, V, Ti, Nb and W is formed on the linking pins, and the surface hardness of the hardened layer is the same as or greater than the hardness of the hard particles.

* * * * *